United States Patent
Booth-Dawson et al.

(10) Patent No.: US 12,163,694 B2
(45) Date of Patent: Dec. 10, 2024

(54) AIR PURIFIER

(71) Applicant: Blueair AB, Stockholm (SE)

(72) Inventors: Bryce Joshua Booth-Dawson, Stockholm (SE); Lars Henrik Dunberger, Stockholm (SE); Lars Johan Wilhelm Hadding Delin, Stockholm (SE); Robert Leonard Stoneman Merret, Stockholm (SE)

(73) Assignee: Blueair AB, Stockholm (SE)

( * ) Notice: Subject to any disclaimer, the term of this patent is extended or adjusted under 35 U.S.C. 154(b) by 558 days.

(21) Appl. No.: 17/425,475

(22) PCT Filed: Jan. 22, 2020

(86) PCT No.: PCT/EP2020/051518
§ 371 (c)(1),
(2) Date: Jul. 23, 2021

(87) PCT Pub. No.: WO2020/156906
PCT Pub. Date: Aug. 6, 2020

(65) Prior Publication Data
US 2022/0088519 A1    Mar. 24, 2022

(30) Foreign Application Priority Data

Jan. 28, 2019  (CN) .......................... 201920145465.4
Jan. 28, 2019  (EP) ..................................... 19153982

(51) Int. Cl.
*F24F 8/80*       (2021.01)
*B01D 46/00*    (2022.01)
(Continued)

(52) U.S. Cl.
CPC ............ *F24F 8/80* (2021.01); *B01D 46/0002* (2013.01); *B01D 46/0043* (2013.01);
(Continued)

(58) Field of Classification Search
CPC ....................... B01D 46/0002; B01D 46/0043; B01D 46/58; B01D 2273/30; F04D 29/281;
(Continued)

(56) References Cited

U.S. PATENT DOCUMENTS

D570,464 S  *  6/2008  Normark ...................... D23/364
D597,187 S  *  7/2009  Campbell ..................... D23/356
(Continued)

FOREIGN PATENT DOCUMENTS

CN   101532704   9/2009
CN   102748817   5/2014
(Continued)

OTHER PUBLICATIONS

Rabbit Air BioGS 2.0 Review, Jan. 2020, accessed Dec. 27, 2023 https://www.youtube.com/watch?v=Rili9PpWBL8 (Year: 2020).*
(Continued)

*Primary Examiner* — Christopher P Jones
*Assistant Examiner* — Phillip Y Shao
(74) *Attorney, Agent, or Firm* — Carter, DeLuca & Farrell, LLP; George Likourezos, Esq.

(57) ABSTRACT

An air purifier comprising a fan or impeller, an air inlet and an air outlet and a removable particulate filter, the purifier comprising a front panel and a back panel, a first and second opposing side panel between said front and back panels, a base and a top panel, said outlet being disposed along a portion of an edge formed between the top and side panels and also along an edge formed between a portion of said side panels and a portion of said front panel.

10 Claims, 6 Drawing Sheets

(51) Int. Cl.
  *B01D 46/58* (2022.01)
  *F24F 1/035* (2019.01)
  *F24F 8/10* (2021.01)
  *F24F 8/108* (2021.01)
  *F24F 13/072* (2006.01)
  *F24F 13/20* (2006.01)

(52) U.S. Cl.
  CPC ............. *B01D 46/58* (2022.01); *F24F 1/035* (2019.02); *F24F 8/10* (2021.01); *F24F 8/108* (2021.01); *F24F 13/072* (2013.01); *F24F 13/20* (2013.01); *B01D 2273/30* (2013.01); *F24F 2013/207* (2013.01)

(58) Field of Classification Search
  CPC ......... F04D 29/4233; F24F 1/035; F24F 8/10; F24F 8/108; F24F 8/80; F24F 11/50; F24F 11/89; F24F 13/072; F24F 13/20; F24F 13/28; F24F 2013/205; F24F 2013/207
  See application file for complete search history.

(56) References Cited

U.S. PATENT DOCUMENTS

| | | | |
|---|---|---|---|
| D633,996 S | | 3/2011 | Laut et al. |
| D745,954 S | * | 12/2015 | de Siqueira Indio da Costa ........ D23/355 |
| D747,789 S | * | 1/2016 | Stoner, Jr. ................... D23/355 |
| 9,808,754 B2 | * | 11/2017 | Stoner, Jr. ............. B01D 46/62 |
| 2004/0182244 A1 | * | 9/2004 | Wu ...................... F24F 1/0071 55/385.2 |
| 2004/0201485 A1 | * | 10/2004 | Dermody ........... B01D 46/0086 340/607 |
| 2007/0000219 A1 | | 1/2007 | Park et al. |
| 2016/0114276 A1 | | 4/2016 | Yu et al. |
| 2018/0001248 A1 | | 4/2018 | Jung et al. |
| 2019/0242607 A1 | * | 8/2019 | Peng ................... F21V 33/0088 |
| 2020/0386423 A1 | * | 12/2020 | Chu ........................ F24F 8/80 |

FOREIGN PATENT DOCUMENTS

| | | | | |
|---|---|---|---|---|
| CN | 205299860 U | | 6/2016 | |
| CN | 106288013 | | 1/2017 | |
| CN | 207024855 U | | 2/2018 | |
| CN | 108036403 | | 5/2018 | |
| CN | 108534251 A | | 9/2018 | |
| EP | 3392575 | | 10/2011 | |
| EP | 3076099 | | 10/2016 | |
| JP | S4886134 U | | 10/1973 | |
| JP | H0487720 Z | | 7/1992 | |
| JP | 07318121 | | 12/1995 | |
| JP | 09057033 A | | 3/1997 | |
| JP | 2013245854 A | | 12/2013 | |
| JP | 2015141000 A1 | | 8/2015 | |
| JP | 2016180585 A | | 10/2016 | |
| JP | 2019174037 A | | 10/2019 | |
| KR | 1020070002513 | | 1/2007 | |
| KR | 20090047920 | | 5/2009 | |
| KR | 20100114601 A | | 10/2010 | |
| KR | 20180005369 A | | 1/2018 | |
| WO | WO2013176213 | | 11/2013 | |
| WO | WO-2015171571 A2 | * | 11/2015 | .......... F21V 33/0088 |
| WO | 2015186804 A1 | | 12/2015 | |
| WO | WO2018079897 | | 5/2018 | |

OTHER PUBLICATIONS

Rabbit Air website of BioGS 2.0 Air Purifier, 2014, accessed Dec. 27, 2023 https://web.archive.org/web/20140820081331/https://www.rabbitair.com/pages/biogs2-air-purifier (Year: 2014).*
Amazon page for Rabbit Air BioGS 2.0, accessed Dec. 27, 2023 https://www.amazon.com/dp/B00GH19UU2/ref=twister_B00GS1BLR6?_encoding=UTF8&th=1 (Year: 2023).*
Search Report and Written Opinion in EP19153982; Jul. 12, 2019.
International Preliminary Report on Patentability and Written Opinion in corresponding International Application No. PCT/EP2020/051518 dated Jul. 27, 2021 (7 pages).
Search Report and Written Opinion in PCTEP2020051518; May 4, 2020.

* cited by examiner

AIR PURIFIER

The invention relates to an improved air purifier.

CN 102748817 discloses a high-efficiency multifunctional modular interior air purification device. A device main body is cylindrical and consists of three cylindrical function modules which are combined and include a main I function module, a power control module and an additional function module from bottom top. The main function module with 360-degree omnibearing intake air design consists of a protective hood, a free rotating guide plate, a washable prefiltering glass fiber layer, an attached active carbon adsorption layer, an attached nano active carbon adsorption layer, a high-efficient PTFE filter layer, a load nano TiO2 porous ceramic sequentially from bottom top, as well as a UV lamp in the middle from the outside to the inside; the power control module consists of a power cord, a multifunctional power jack, a fan and a control panel; and the additional function module consists of a cylindrical guide plate, a guide protective hood and a solid essential oil dispersion box/negative ion generator/humidifier and the like. The high-efficiency multifunctional modular interior air purification device is compact in design structure, has no noise pollution, low energy consumption and an obvious purification effect, and is suitable for use in various interior places.

CN 106288013 discloses a shell assembly of a desktop air conditioner and the desktop air conditioner. The shell assembly of the desktop air conditioner comprises a cylinder assembly, and a middle partition plate. A cylinder limiting part is arranged on the inner circumferential wall of the cylinder assembly. The middle partition plate is vertically arranged in the cylinder assembly and is provided with a partition plate limiting part. The cylinder limiting part is suitable for abutting against the partition plate limiting part. According to the shell assembly of the desktop air conditioner, due to the fact that the cylinder limiting part is arranged on the inner circumferential wall of the cylinder assembly, the partition plate limiting part is arranged on the middle partition plate, and the cylinder limiting part abuts against the partition plate limiting part the middle partition plate and the cylinder assembly can be limited; and when the middle partition plate is fixed, the cylinder assembly can be fixed, and therefore reliability of the shell assembly is improved.

EP 3 076 099 discloses A ceiling-embedded air conditioner includes: a decorative panel; a turbo fan; a heat exchanger; a drain pan including a drain sheet; an air suction path; cuboidal air blow-off paths that are provided at four places surrounding the air suction path; and rectangular air blow-off openings that are provided in the decorative panel. The air blow-off paths are integrated with the drain pan. Airflow guide vanes are provided in the air blow-off paths to direct part of the blown airflow toward the short side of the air blow-off opening. Attachment portions formed of the same material as that for the drain sheet and configured to attach the airflow guide vanes are provided at an inflow-side opening portions of the air blow-off paths.

U.S. Pat. No. D633 996 discloses a design for a compact air purifier.

WO 2013/176213 discloses a device which turns on when an air-directing plate comes to a position where an air outlet opens and turns off when the air-directing plate comes to a position where the air outlet closes. When a plug and an installation part come into contact with an installation surface, the plug and a terminal unit electrically connect with one another. A holding member for holding a charged particle generation element forms a portion of a duct by being adjacent to an exhaust port, and is provided so as to be able to be integrally detached from the case along with the charged particle generation element.

WO 2018/079897 discloses an air conditioner comprising: a housing provided with a flow path through which a fluid is transported; and a fluid heating unit installed on the housing to heat the fluid transported through the flow path. As a result, the fluid, which is filtered, humidified, and externally discharged through a discharge grill, is discharged after being heated by the fluid heating unit, thereby maintaining indoor air in a more refreshing state.

Despite the prior art there remains a need for air purifiers with improved air flow performance. There is also a need for air purifiers with improved aesthetics to avoid their being placed out of sight into parts of a room where they become ineffective if they do not have the right air flow performance. In particular, consumers do not like detectable air flow when near an air purifier for example when walking past a working purifier or when an air purifier is near objects which may be blown away or disrupted by any air flow. This is particularly the case when devices are in automatic mode whereby the air flow speed is controlled by the device and not the user. A sudden increase in air flow speed can be quite a distraction when the consumer is unaware of any change in atmospheric condition.

Accordingly, there is provided an air purifier comprising a fan or impeller, an air inlet and an air outlet and a removable particulate filter, the purifier comprising a front panel and a back panel, a first and second opposing side panel between said front and back panels, a base and a top panel, said outlet being disposed along a portion of an edge formed between the top and side panels and also along an edge formed between a portion of said side panels and a portion of said front panel and wherein the outlet is additionally disposed along a portion of the edge between the top panel and the back panel.

The design of the air purifier according to the first aspect provides improved aeration in the domestic setting. In particular, the use of elongated air outlets along the edges of the design results in hugely improved air flow characteristics. The location of outlets at the edges between the top and side and also the side and front panels results in egress of air in a manner which avoids many of the disadvantages of current designs. In stead of air being unchanneled the air is passed through elongate slots along the edges, edges being disposed at the rear and side such that air is expelled in many different directions without any additional directional guidance, for example by way of channels or deflectors which would result in an increase in pressure drop as air passes through the device. An increase in pressure drop means a reduction in air flow for the same fan speed and thus energy consumption. A reduction in pressure drop is thus usually corrected by a consequential increase in fan speed for the same performance. Accordingly, a design which permits improved air flow characteristics without any impact on pressure drop is a huge advantage.

In addition, the placement of outlets at the top end of the device at portions of the edges between the top and sides, and also the front and sides, means that air is not blasted in one direction but instead is able to be dispersed into ambient surroundings without impacting the immediate air space in a manner which the consumer does not want.

The outlet is additionally disposed along a portion of the edge between the top panel and the back panel. The use of a portion of the edge between the back panel and the top panel further helps to dissipate the air in a manner which is not disruptive to the immediate environment. More preferably, the outlet runs along the entire length of the edge between the top and back panels.

Preferably, the outlet runs along the entire length of each of the edges between the side and top panels. In a more preferred embodiment the outlet runs at least 90% and most preferably the entire length along each side and also along the back such that the outlet constitutes three sides of the top panel. Such a design further improves the dissipation of air as it passes through the air purifier and back out to ambient.

Preferably, the inlet is disposed on at least one of said first and second opposing side panels. Drawing air into the purifier further contributes to the air flow dynamics of the device and helps generate an air flow pattern which does not disrupt the immediate air environment in a manner which consumers find uncomfortable. More preferably, each of the side panels comprises an air inlet and most preferably the air inlet on each side panel is disposed on a lower half of said side panel. By this is meant that the aperture(s) defining the air inlet is/are disposed entirely within the lower half of the side panel by area. Preferably, the or each air inlet comprises a reticulated cover or a series of apertures puncturing the side panel. The reticulated cover may be removable and function additionally as a pre-filter.

Preferably, the fan or impeller displaces air by means of a volute in a substantially vertical direction. By this is meant that the fan or impeller displaces air in a substantially vertical direction when in an operating configuration and one in which the device is supported on its base and the top panel faces substantially upwards.

When the fan or impeller displaces air in a substantially vertical direction means that the air is drawn in from the sides and undergoes only one significant change in direction (in the volute) before passing out of the device at the air outlets at the edged. This results in far superior air flow dynamics than other purifiers.

Preferably, the base is substantially flat to the ground in a working configuration. More preferably, the base comprises feet to support the base from the ground but it is also preferably for the base to comprise one or more wheeled means for easily locating or relocating the purifier within the domestic setting. Most preferably, the base comprises feet and wheeled means. Preferably, the feet are composed of resilient material such as rubber or elastomer to provide a damping effect and for preventing vibrations caused by functioning from being transferred to external surfaces.

Preferably, the back panel is angled at from 70 to 90 degrees and more preferably from 80 to 90 degrees with respect to the base. More preferably, the back panel is angled towards the front as the back panel extends away from the base.

Preferably, the area of the maximum footprint of the top panel is from 50 to 95% the area of the maximum extended footprint of the base panel.

Preferably, said front and top panels are formed from a single component which is preferably moulded or bent into functional shape. Preferably, the front, top and base panels are formed from a single discrete item. Preferably, the top and front, and more preferably the top and front and base is formed from one item which is folded, or more preferably, curved around the purifier such that the base remains flat.

Preferably, the side and back panels are formed from a single component which is preferably moulded or bent into functional shape.

Preferably, the unitary component forming the side and back panels is fitted to the unitary component forming the base, front and top panels (in the manner of the two panels used to form a tennis ball) to form the external housing for the purifier and such that there is a space between the two at the edges between the two components. The result of such a design is a machine which draws air in from the sides, expels it through edges while at the same time giving the appearance of a unitary item with large air intake or outlet areas through which air is drawn and expelled.

Functionally, this also means that the device is not blowing air onto the consumer during operation and instead is dispersed in a seemingly unseen manner. We have surprisingly found that such a device is more likely to be employed in more effective manner than standard air purifiers which have large air intakes and large air outlets and which are usually hidden away so as not to blow air onto the consumer.

Preferably, the removable particulate filter is disposed at an angle of from 5 to 30 degrees from the vertical when the purifier is in a working disposition. Preferably, the air purifier comprises a pair of removable particulate filters having a general filter plane and which are disposed such that the general filter plane is substantially orthogonal to the front panel. Such a design means that air passing into the purifier through the air intakes in the side panels then passes upwards towards the top panel and thereby directly through the particulate filters. The angle of the particulate filters is such that air is also channelled towards the edges around the top panel and so facilitates air removal through the outlets. Preferably, the pair of filters are hingedly connected to one another at an apex, i.e. towards the top panel of the purifier, when in a functioning configuration.

Preferably, the air purifier comprises a user interface on said top panel. In such a configuration the user will be unaware of air passing out of the purifier while operating the user interface since the position directly in front of the front panel is sheltered by the front panel. The user interface preferably comprises a touch screen panel by which operation or set-up of the device can be performed.

Preferably, at least one of the side panels comprises an operable door. More preferably, the entire side panel functions as an operable door. The operable door can be opened by the consumer to clear excessive dust from the interior of the purifier and to replace particulate filters. The door may also be operable by a service technician to service the machine.

In the most preferred embodiment the front, side, base, top and back panels are attached to an internal frame which provides the structural integrity of the purifier with the panels being attached to the frame. Similarly, the fan or impeller is also fitted onto the frame. The removable particulate filters may be attachable to the frame or to internal fittings of one or more of the panels.

Preferably, the edges between the panels are from 10 mm to 90 mm in an average width extending for the entire length of any one edge. More preferably, the edges between the panels are from 30 to 60 mm in an average width extending for the entire length of any one edge. The space created between the panels is important in managing the air flow dynamics during operation. If the area is too small, the pressure drop increases and so fan speed must be raised to achieve the same efficacy. Similarly, the pressure as the air is expelled is raised and this results in a greater chance of the consumer being distracted by strong air currents, a huge consumer negative.

Preferably, the spaces between the panels at the edges is spanned by a grate. Such a grate comprises relatively large apertures so as not to increase the pressure drop in a manner which detracts from the efficiency of the purifier. This is in contrast to pre-filters, poke guards or reticulated covers which have a high number of small apertures which do not direct the air but nonetheless have a negative effect on air resistance. In contrast the grate used in the present purifier preferably comprises air deflectors. Such air deflectors function by further directing the air in a manner which improves the dispersion of air as it passes out of the purifier. Preferably, such deflectors are curved such that they are concave with respect to the panels. More preferably, the deflectors comprise an array of grooves, more preferably angled away from the vertical either towards the front panel as the groove extends from the side panel to the top panel or front panel. Such a design further manipulates the air stream as it passes from the purifier without impacting the pressure drop in the same manner as does a pre-filter or small aperture grill.

Preferably, the back panel extends further back than a back edge of the top panel when viewed from the side. Similarly, it is preferred that the side panels extend further than the top panel when viewed from the front. In such an embodiment the dimensions of the air outlet is thus formed not just by the mere presence of a gap between the panels but by making the top panel smaller than the footprint of the top edges of the back and side panels. This makes it easier for air (moving in a vertical direction) to pass out from the device in use and makes it easier to spread the air expulsion in a manner which circulates the air more effectively and so makes it easier and faster to clean a room for a given energy consumption. Preferably, the footprint when viewed from above of the top panel is from 60 to 95% of the area of the footprint of the top most edges of the side and back panel at the average height of the top most edge of the side panels. In such a calculation the footprint of the top most edges of the back and side panels is mathematically extended to meet the front panel despite in practice there likely being a gap formed by the outlet.

The device according to the invention thus presents a materially different visual impact on the consumer than other air purifiers which typically have a cage-like structure at the air inlet and outlet. Not only does the cage-like structure present an unappealing aesthetic effect but it also attracts dust as air enters and leaves the device. Visually unappealing products are typically hidden away from view, for example, behind sofas or in the corner, where they can be less effective at purifying the ambient air.

The air purification device cleans air by drawing in air from the exterior, through the air intake. The air then passes past a fan or impeller and towards the air outlet, through which the air passes back to the exterior of the device. Somewhere between the air inlet and the air outlet will be a filter which is designed to filter the air of pollutants and thus the air is cleaned. The filter is usually removable and so does not form part of the device as manufactured. The filter may be before or after the fan but will always be between the air intake and the air outlet.

The edges between the panels are preferably in the form of an elongate slot. Such a design permits greater control over air intake, where required, and air egress. We have surprisingly found that the design according to the invention thus is able to perform as an air purifier more effectively than prior art designs which may employ a greater surface area through which to draw the air into the device or out from the device. We have found that in such prior art devices the air is not efficiently re-circulated in the room and instead devices often clean the air in the vicinity of the device over and over again. This is particularly the case for devices which are not aesthetically pleasing as they are often hidden behind items of furniture in the room.

The purifier is powered by any suitable power source including internal sources, e.g. batteries, as well as external power sources. The power is used to drive a motor which in turn powers at least the air flow generator and the ioniser where present.

Preferably, the filter media comprises at least one of carbon, activated carbon, a non-woven, a thermoplastic, a thermosetting material, a porous foam, fibreglass, paper, a high loft spunbound web, a low loft spunbound web, a meltblown web and or a bi-modal fiber diameter meltblown media.

Preferably, the removable particulate filter is a High Efficiency Particulate Air (HEPA) filter. It is to be understood that while the filter part of an air purifier is a vital part of its function, air purifiers are not commonly manufactured with a filter in place. They are practically always manufactured separately and most importantly often by a different commercial enterprise than of the manufacturer of the air purifier itself. It is also typical for a manufacturer of filters to manufacture filters for different air purifier models made by different manufacturers. The particulate filter is to be contrasted with the pre-filter or any dust filter which is present. Pre-filters and dust filters are not considered HEPA filters as they do not have the particulate capturing capability exhibited by HEPA filters. Preferably, the filter is pre-charged before application to the air purifier.

Pre-filters are filters which have a low air resistance and also function as a poke guard, preventing the user from touching the volute or impeller assembly. The pre-filters are not intended to exhibit any major effect in the context of air purification. They do not have the air resistance or particle entrainment capability of dedicated particulate filters. Preferably the pre-filter is not a HEPA filter.

The purifier of the inventions also comprises a fan or impeller. The fan may be a bladeless fan, an axial fan but it is preferred that the fan is a radial fan.

Preferably, the air purifier comprises an ioniser. Preferably, the ioniser comprises a corona discharge tip and a receiving electrode. When the corona discharge tip is subjected to an appropriate electric voltage it generates an ion field between the tip and the receiving or ground electrode.

The ioniser may be disposed on the interior or the exterior of said purifier. Where the ioniser is disposed on the exterior of said device it is preferred that it is disposed at the top of the device. Locating the external ioniser at the top of the device means that domestic dust particles are ionised as they fall through the air towards the ground and are therefore more likely to aggregate as they become charged. As they become more aggregated they are more easily caught up in the air circulation pattern created by the device and so more easily filtered.

Where the ioniser is disposed in the interior of the device it is preferred that it is located before the removable particulate filter in an air flow direction.

Preferably, the device comprises an interior ioniser and an exterior ioniser. The exterior ioniser facilitating aggregation of domestic dust particles and the interior ioniser facilitating capture of the aggregated dust particles by the removable particulate filter. In both instances the ionisation permits less dense filtration media and low air speed (fan) speeds.

Embodiments of the device will now be described with reference to the following figures.

FIGS. 1 to 6 show an air purifier according to one embodiment of the invention while

FIG. 1 is a perspective view of the top, front and left-hand side of an embodiment of the invention.

FIG. 2 is a perspective view of the top, back and right-hand side of an embodiment of the invention.

FIG. 3 is a plan view of an embodiment of the invention.

FIG. 4 is a side elevation of the right-hand side of an embodiment of the invention.

FIG. 5 is a front elevation of an embodiment of the invention.

FIG. 6 is a perspective view of the base, back and right-hand side of an embodiment of the invention.

FIG. 7 is a perspective view of a second embodiment;

FIG. 8 is a front view of the embodiment shown in FIG. 7;

FIG. 9 is a rear view of the same embodiment; and

FIG. 10 is a side elevation of the same embodiment.

Figure 1:
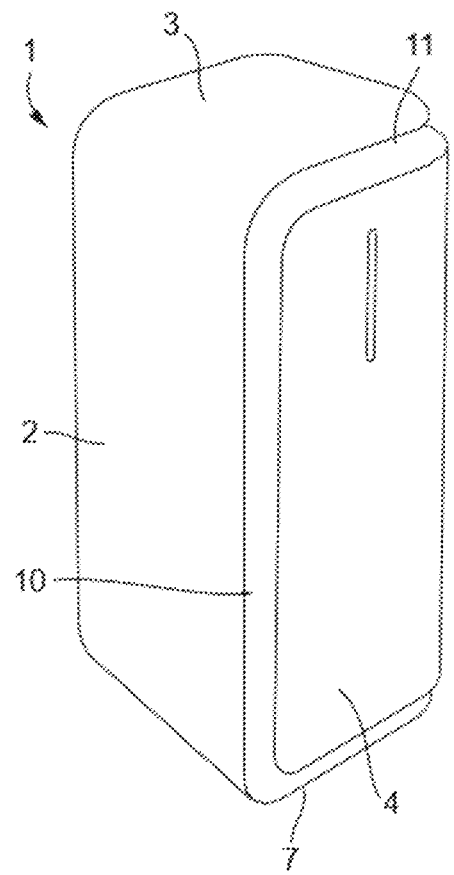

In detail, FIG. 1 shows a purifier (1) having a front (2), a top (3) and a base (7) on which the purifier is supported. The base (7), front (2) and top (3) are formed from one single item of panelling so that the panel curves from the base (7) around to form the front (2) and then once more to form the top (3). The side panel (4) is also unitary with the back and opposing side which is not shown. Between the top and right-hand side is an aperture (11) which also functions as an air outlet and through which air passes from inside the device to the exterior. There is also an aperture (10) formed between the side panel and the front panel and towards the base (7) this will function as an air inlet and towards the top (3) this will function as an air outlet.

Figure 2:
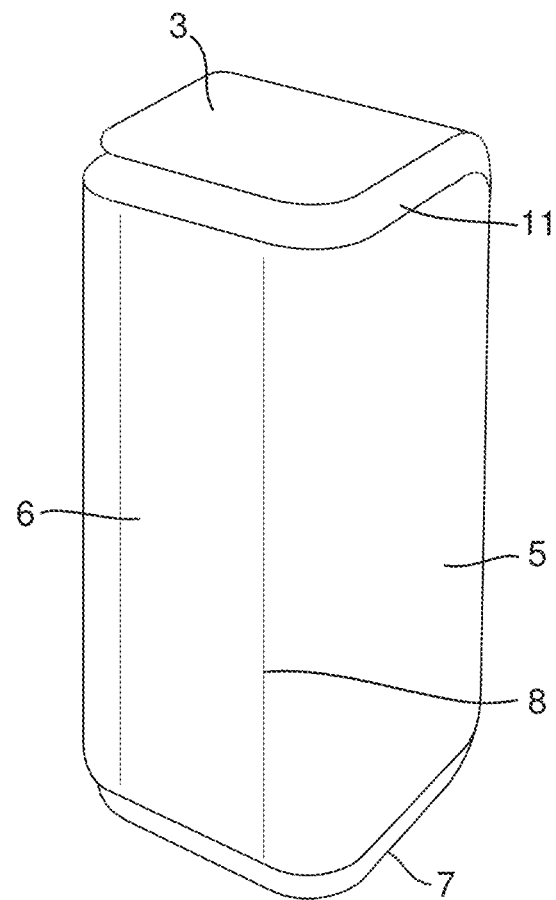

FIG. 2 shows the same embodiment but from the rear and side. Shown are the top (3), the right-hand side (5) and the back (6). As before, the base (7) is indicated but unseen. The gap (11) this time is between the top (3) and side (5) as well as between the top (3) and back (6) so that it extends all the way around the top (3) from side, along the back and along the opposing side. It does not, however, extend along the edge between the top (3) and the front (2).

The side (5) is openable along a hinge (8) running down the back but otherwise the opposing sides and the back are contiguous.

Figure 3:
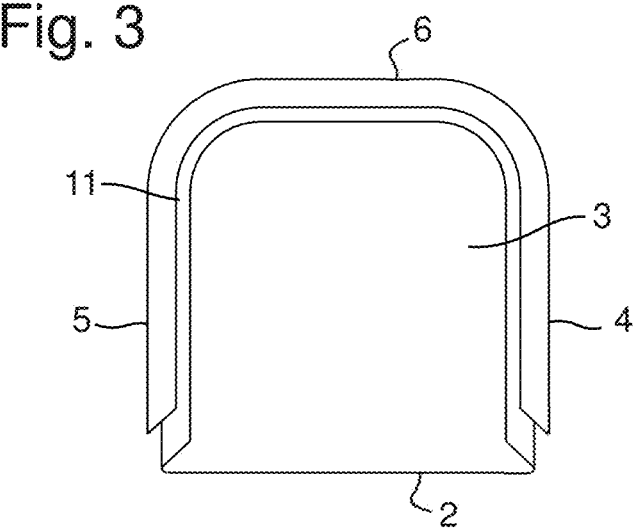

FIG. 3 shows the top (3) of the same embodiment. The edge (11) runs between the two parts forming the top (3), front (2) and base (7); and the sides (4, 5) and back (6) such that it runs along the sides and back only.

Figure 4:
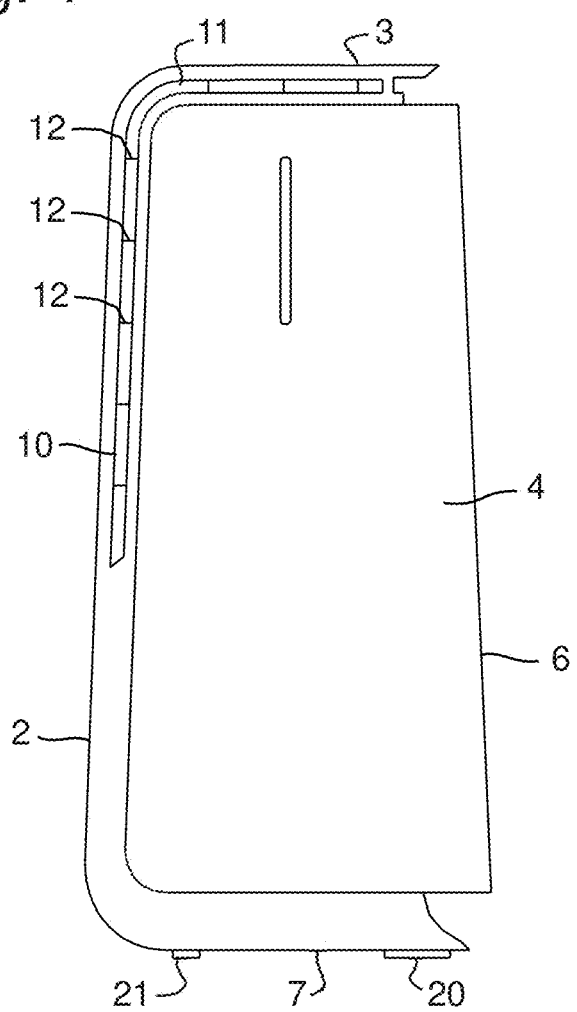

FIG. 4 shows the same embodiment but from the right-hand side. Shown on the base (7) are one of the feet (20) and one of the wheels (21) for maintaining the purifier (1) in position and also for facilitating movement to a new position. The gap between the side (4) and back (6) is an air outlet (10) formed between the components making the front, top and bottom; and the sides and back and through which air is expelled after being cleaned. Within the air outlet (10) is a series of air deflectors for deflecting the air in a manner which improves air circulation during operation.

Figure 5:
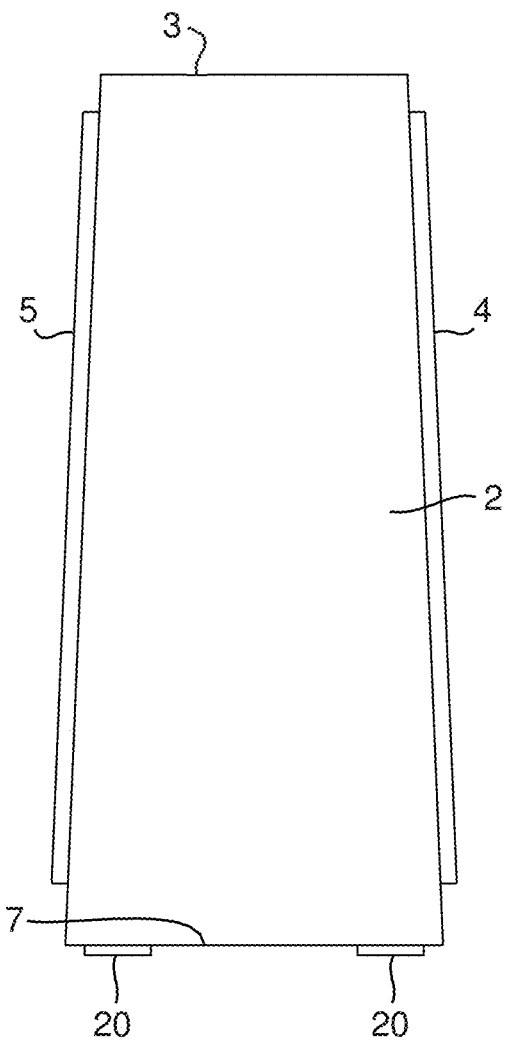

FIG. 5 shows a front view of the same embodiment. The two feet (20) are shown at the bottom of the base (7). Also shown is the relationship between the front (2) and side panels (4, 5).

Figure 6:
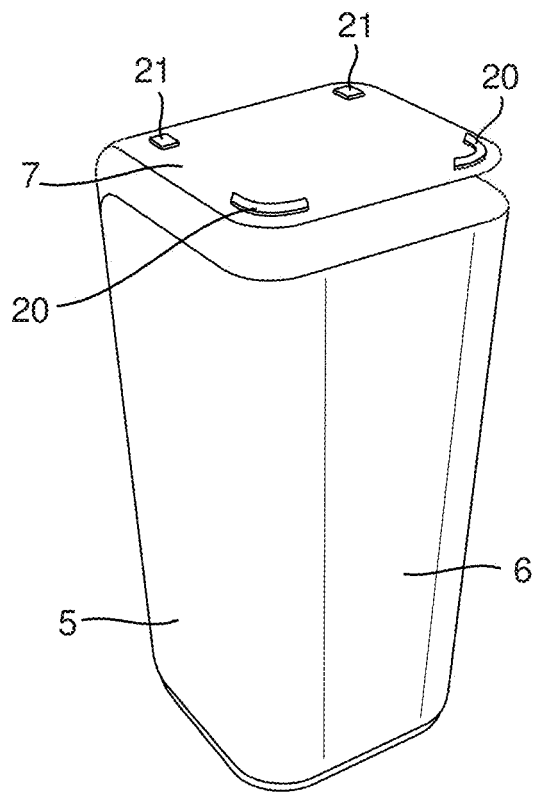

FIG. 6 shows the base (7), back (6) and right-hand side (5) of the same embodiment showing the arrangement of feet (20) and wheels (21).

Figure 7:
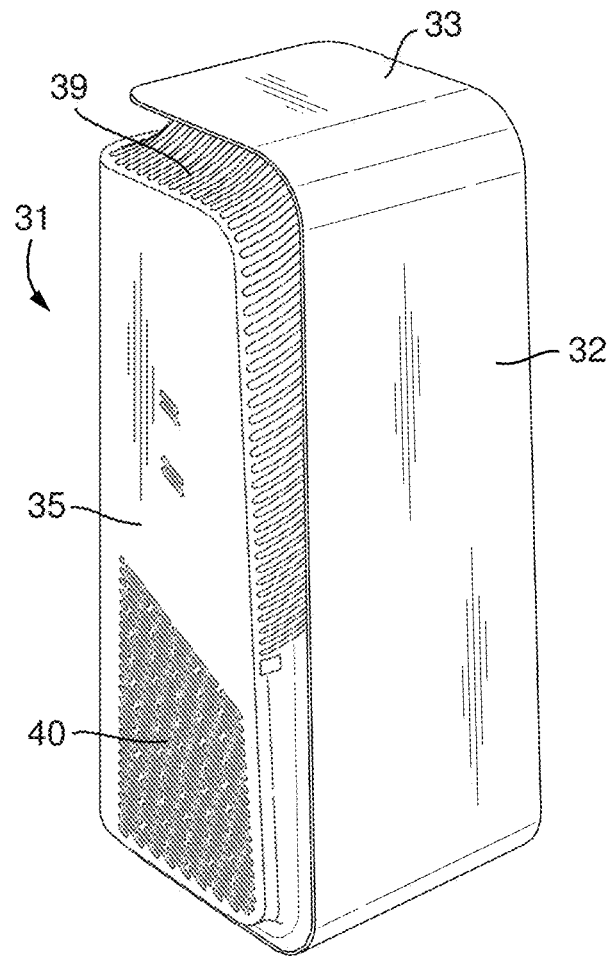
FIGS. 7-10 are of a similar but different embodiment.

FIG. 7 shows an alternative embodiment in which the gaps between the two panels are filled with deflectors to deflect the expelled air in a manner which is more appreciable by the consumer and less invasive.

The top (33), front (32) and base (not shown) are formed from a single component curved to form a base which is substantially parallel to the top (33). The right-hand side panel features an air inlet at the lower part towards the base through which air passes into the purifier (31). As the air passes through the purifier (31) it is cleaned by particulate filters (not shown) and expelled through the air outlets in the gap (39) between the top/front panel component and the side/back panel component.

Figure 8:
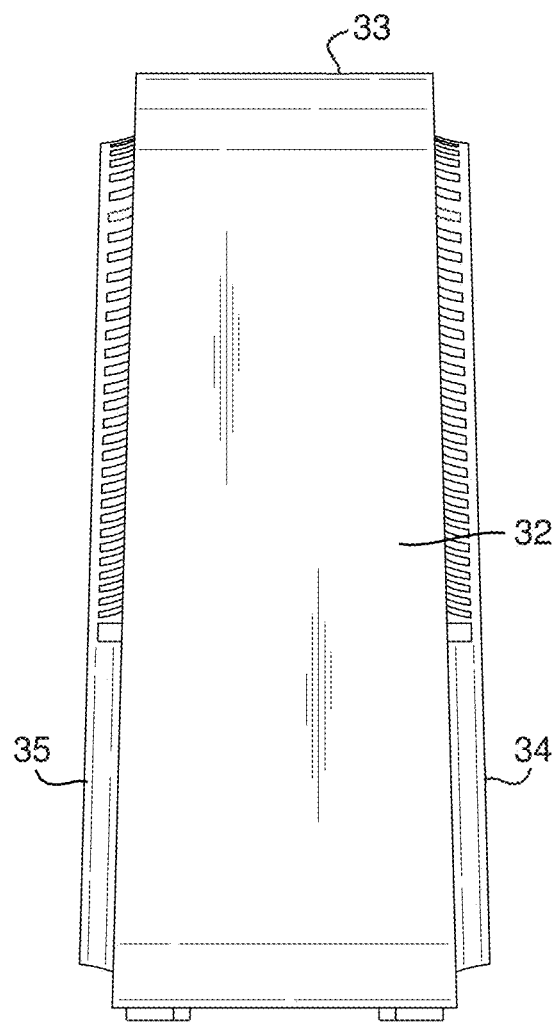

FIG. 8 shows the same embodiment as in FIG. 7 showing the spatial relationship between the side panels (34 and 35) and the front panel (32).

Figure 9:
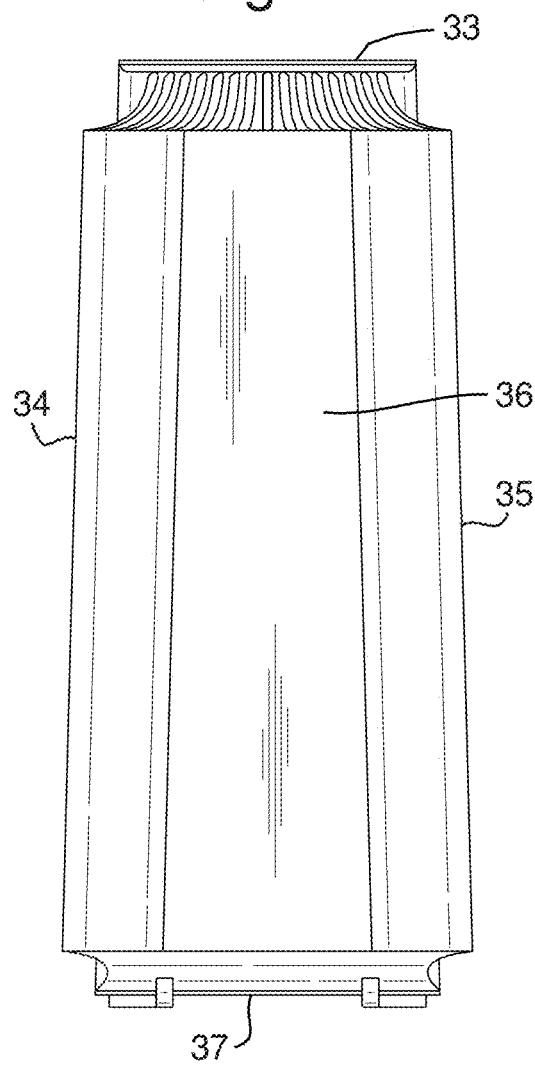

FIG. 9 is another view of the same embodiment as in FIGS. 7 and 8 but from the rear. Shown is the back panel (36) contiguous with the side panels (34 and 35). The gap between the top panel (33) and the back panel (36) forms part of the air outlet.

Figure 10:
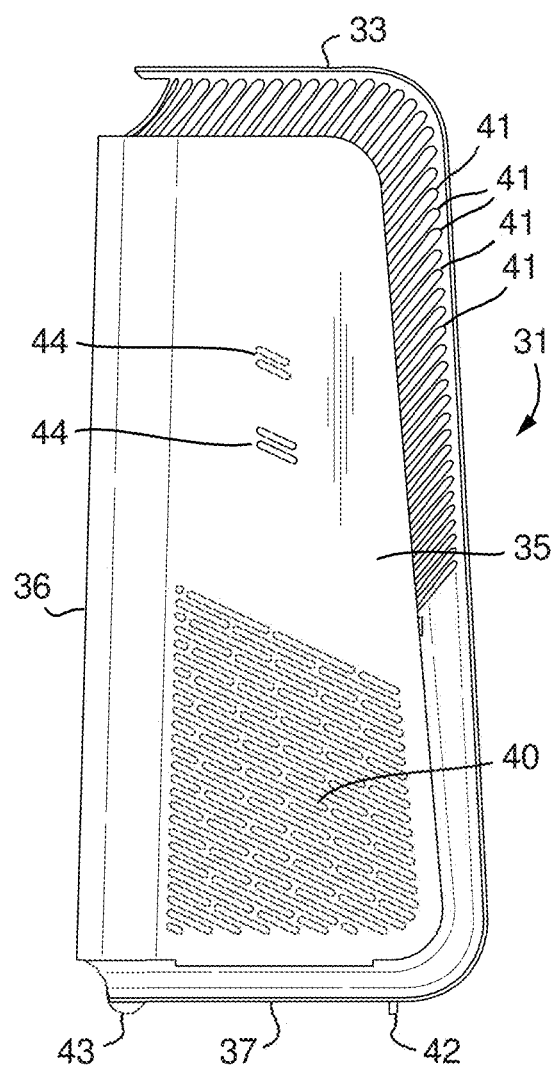

FIG. 10 shows the same embodiment as in FIGS. 7-9. The side panel (35) has an air inlet (40) in the form of an array of apertures at a lower end of the side panel (35). Air is drawn into these apertures by a fan (not shown) and through particulate filters (not shown) and which filter the air. The air is expelled through the space formed between the two panel components as described above.

The gap between the two components also contains a deflector apparatus for deflecting the air as it passes out of the purifier (31). The deflector apparatus is composed of individual slots (41) which are angled such that air is directed more easily away from the purifier in use.

Also shown are sensor intakes (44) which draw air from ambient into an internal chamber separated from the air flow such that air quality measurements can be made by an internally housed sensor (not shown) of the air in the ambient environment. Such measurements may influence performance of the device or be purely for consumer information.

Figure 11:
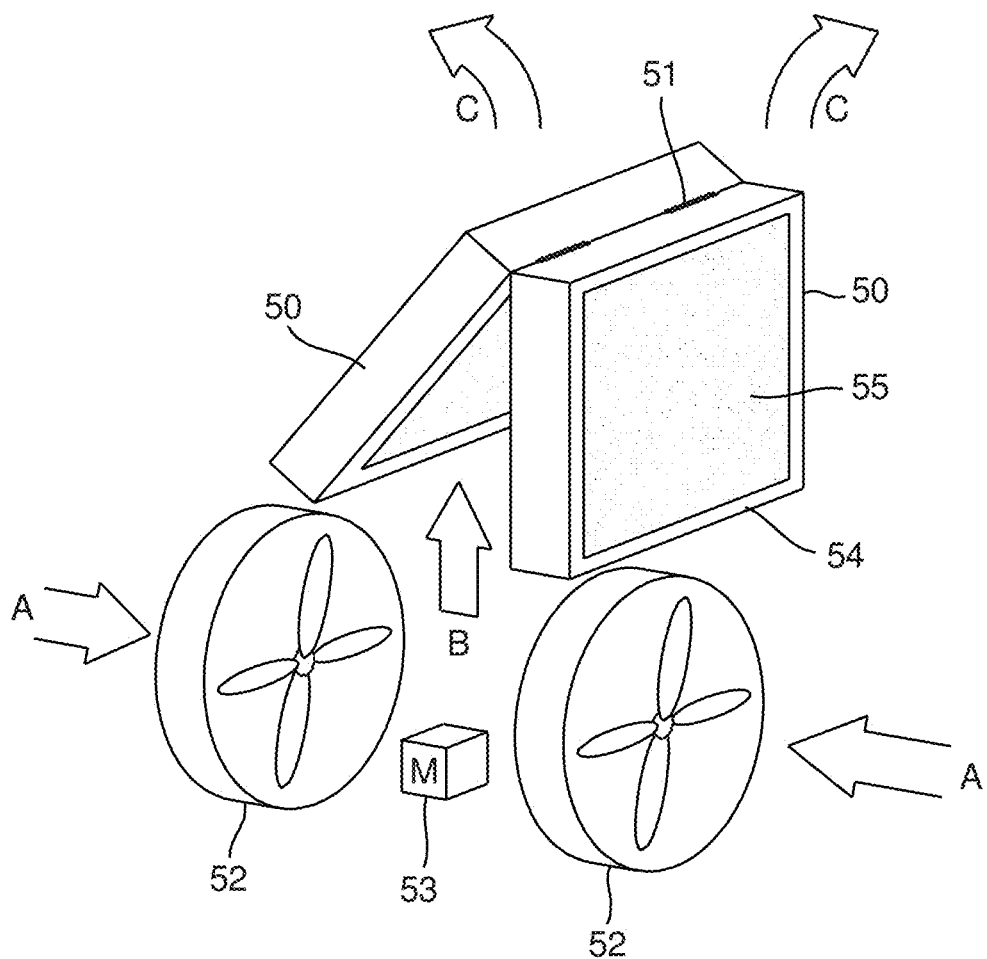
FIG. 11 is a schematic of the internal arrangement of an embodiment.

FIG. 11 is schematic showing the internal relationship of the fans and the filters. Shown are a pair of fans (52) coaxially arranged with respect to one another and which draw air (A) in through the side air intakes as described in the previous two embodiments. The fans are powered by motor (53) which sits between the fans (52). The fans drive air up through the two filters (50) and which constitute a pair of filters attached by way of a hinge (51) such that they are angled with respect to one another. The filters (50) have a cassette (54) which holds the filter media (55). As air passes through the filters (50) it is channelled towards the air outlets as described above.

The spatial arrangement of the embodiment described in this schematic is such that the axis of rotation in the fans is aligned with the air intakes such as those described in FIGS. 7-10 and so the plane of the filters is substantially orthogonal to the front panel (not shown). In such an arrangement the air is channelled towards the edges more easily without any consequential impact on air flow dynamics or pressure drop usually associated with channelling air flow.

The invention claimed is:

1. An air purifier comprising a fan or impeller, an air inlet and an air outlet and a removable particulate filter, the purifier comprising a front panel and a back panel, a first and second opposing side panel between said front and back panels, a base and a top panel, said inlet being a first aperture disposed on at least one of said first and second opposing side panels said outlet being a second aperture disposed along a portion of an edge formed between the top and both side panels and also along an edge formed between a portion of both said side panels and a portion of said front panel and wherein the outlet is additionally disposed along a portion of the edge between the top panel and the back panel.

2. The air purifier according to claim 1, wherein the outlet runs along the entire length of the edge between the top and back panels.

3. The air purifier according to claim 1, wherein the outlet runs along the entire length of each of the edges between the side and top panels.

4. The air purifier according to claim 1, wherein the inlet is disposed on at least one of said first and second opposing side panels.

5. The air purifier according to claim 1, wherein the fan or impeller displaces air by way of a volute in a substantially vertical direction.

6. The air purifier according to claim 1, wherein said front and top panels are formed from a single component.

7. The air purifier according to claim 1, wherein said side and back panels are formed from a single component.

8. The air purifier according to claim 1, wherein the removable particulate filter is disposed at an angle of from 5 to 30 degrees from the vertical when the purifier is in a working disposition.

9. The air purifier according to claim 1, comprising a pair of removable particulate filters having a general filter plane and which are disposed such that the general filter plane is substantially orthogonal to the front panel.

10. The air purifier according to claim 1, comprising a user interface on said top panel.

\* \* \* \* \*